(12) United States Patent
Miwa et al.

(10) Patent No.: US 9,391,674 B2
(45) Date of Patent: Jul. 12, 2016

(54) POWER FEEDING SYSTEM AND POWER FEEDING METHOD

(71) Applicant: SEMICONDUCTOR ENERGY LABORATORY CO., LTD., Atsugi-shi, Kanagawa-ken (JP)

(72) Inventors: Misako Miwa, Miyagi (JP); Koichiro Kamata, Kanagawa (JP); Yutaka Shionoiri, Kanagawa (JP); Shuhei Maeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 593 days.

(21) Appl. No.: 13/864,303

(22) Filed: Apr. 17, 2013

(65) Prior Publication Data

US 2013/0285464 A1    Oct. 31, 2013

(30) Foreign Application Priority Data

Apr. 26, 2012 (JP) ................. 2012-100658

(51) Int. Cl.
| | |
|---|---|
| *H01F 27/42* | (2006.01) |
| *H01F 38/00* | (2006.01) |
| *H01F 37/00* | (2006.01) |
| *H04B 5/00* | (2006.01) |

(52) U.S. Cl.
CPC ............ *H04B 5/0037* (2013.01); *H04B 5/0087* (2013.01)

(58) Field of Classification Search
CPC ............................. H04B 5/0087; H04B 5/0037
USPC ...................................................... 307/104
See application file for complete search history.

(56) References Cited

U.S. PATENT DOCUMENTS

| | | |
|---|---|---|
| 5,124,699 A | 6/1992 | Tervoert et al. |
| 5,428,521 A | 6/1995 | Kigawa et al. |
| 5,790,946 A | 8/1998 | Rotzoll |
| 6,509,217 B1 | 1/2003 | Reddy |
| 6,737,302 B2 | 5/2004 | Arao |
| 6,837,438 B1 | 1/2005 | Takasugi et al. |
| 7,180,421 B2 | 2/2007 | Pahlaven et al. |
| 7,209,771 B2 | 4/2007 | Twitchell, Jr. |
| 7,301,830 B2 | 11/2007 | Takahashi et al. |

(Continued)

FOREIGN PATENT DOCUMENTS

| | | |
|---|---|---|
| JP | 2010-119246 | 5/2010 |
| WO | WO 2010/055381 A1 | 5/2010 |

*Primary Examiner* — Rexford Barnie
*Assistant Examiner* — Toan Vu
(74) *Attorney, Agent, or Firm* — Nixon Peabody LLP; Jeffrey L. Costellia

(57) ABSTRACT

To provide a power feeding system and the like with which charging can be performed without a decrease in the power supply efficiency. To provide a power feeding system and the like with which can offer a power feeding service which is efficient to both a power feeding user and a power feeding provider. The power transmission state in each of power transmitting portions is monitored, the power transmitting portion having the highest power transmission efficiency is selected based on positional advantage, and the power transmitting resonance coil included in the selected power transmitting portion is kept at a first resonance frequency, whereby power transmission continues. The resonance frequency of the power transmitting resonance coil included in the non-selected power transmitting portion (the number of the non-selected power transmitting portions may be plural) is set to a second resonance frequency, whereby power transmission is stopped.

11 Claims, 6 Drawing Sheets

(56) References Cited

U.S. PATENT DOCUMENTS

| | | |
|---|---|---|
| 7,394,382 B2 | 7/2008 | Nitzan et al. |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2003/0157955 A1* | 8/2003 | Jarvisalo ............... H04B 17/102 455/522 |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2010/0052431 A1* | 3/2010 | Mita ..................... B60L 11/182 307/104 |
| 2010/0289449 A1 | 11/2010 | Elo |
| 2011/0080053 A1 | 4/2011 | Urano |
| 2011/0095619 A1 | 4/2011 | Urano |
| 2011/0101791 A1 | 5/2011 | Urano |
| 2011/0270462 A1 | 11/2011 | Amano et al. |
| 2012/0025611 A1 | 2/2012 | Kamata et al. |
| 2012/0025627 A1 | 2/2012 | Shionoiri et al. |
| 2012/0062039 A1 | 3/2012 | Kamata et al. |
| 2012/0147991 A1* | 6/2012 | Matsubara ............ H03F 1/3241 375/296 |
| 2012/0153739 A1* | 6/2012 | Cooper .................. H02J 5/005 307/104 |

* cited by examiner

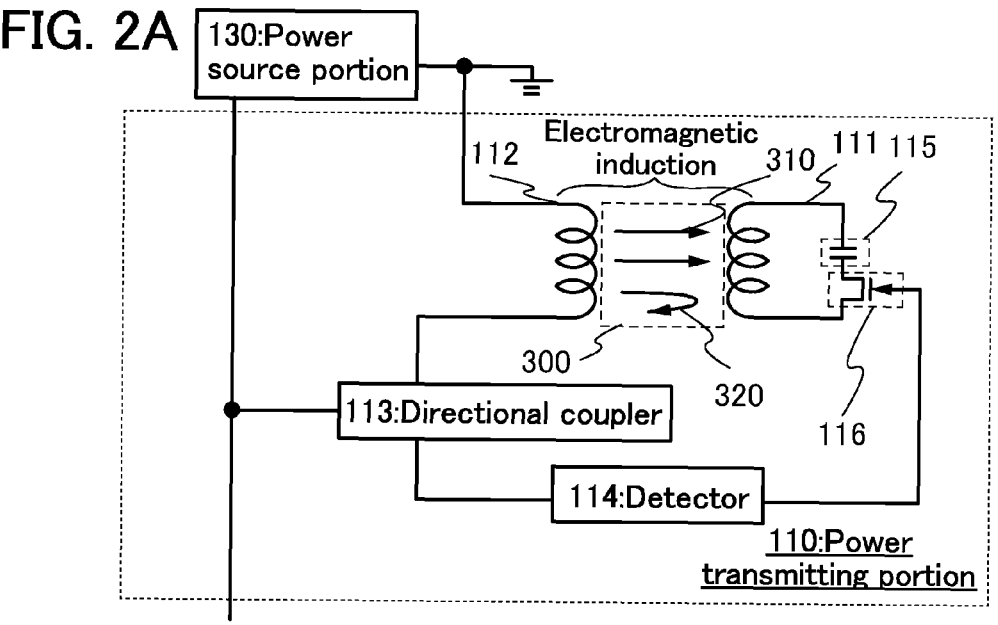
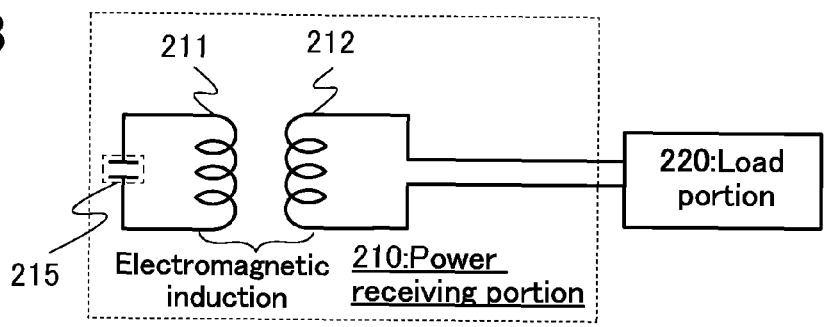
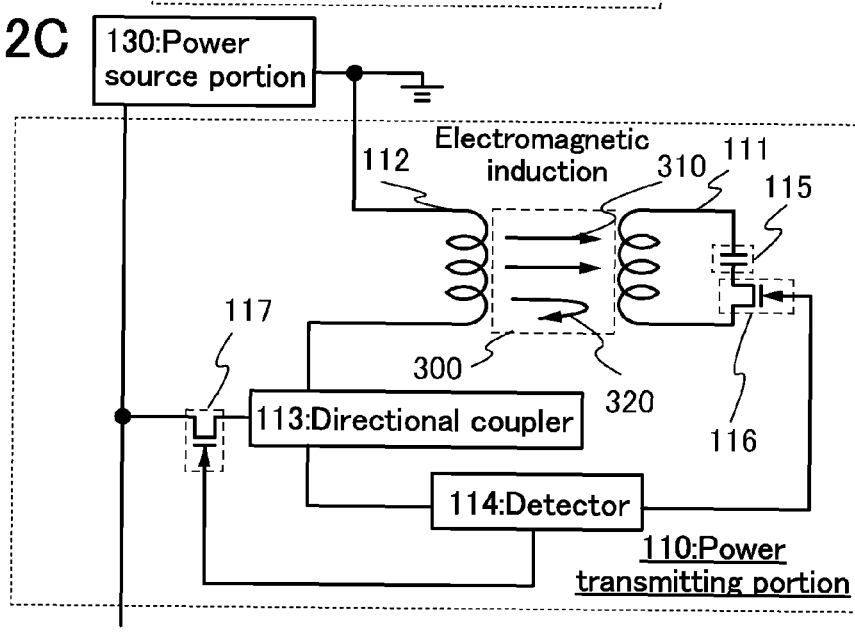

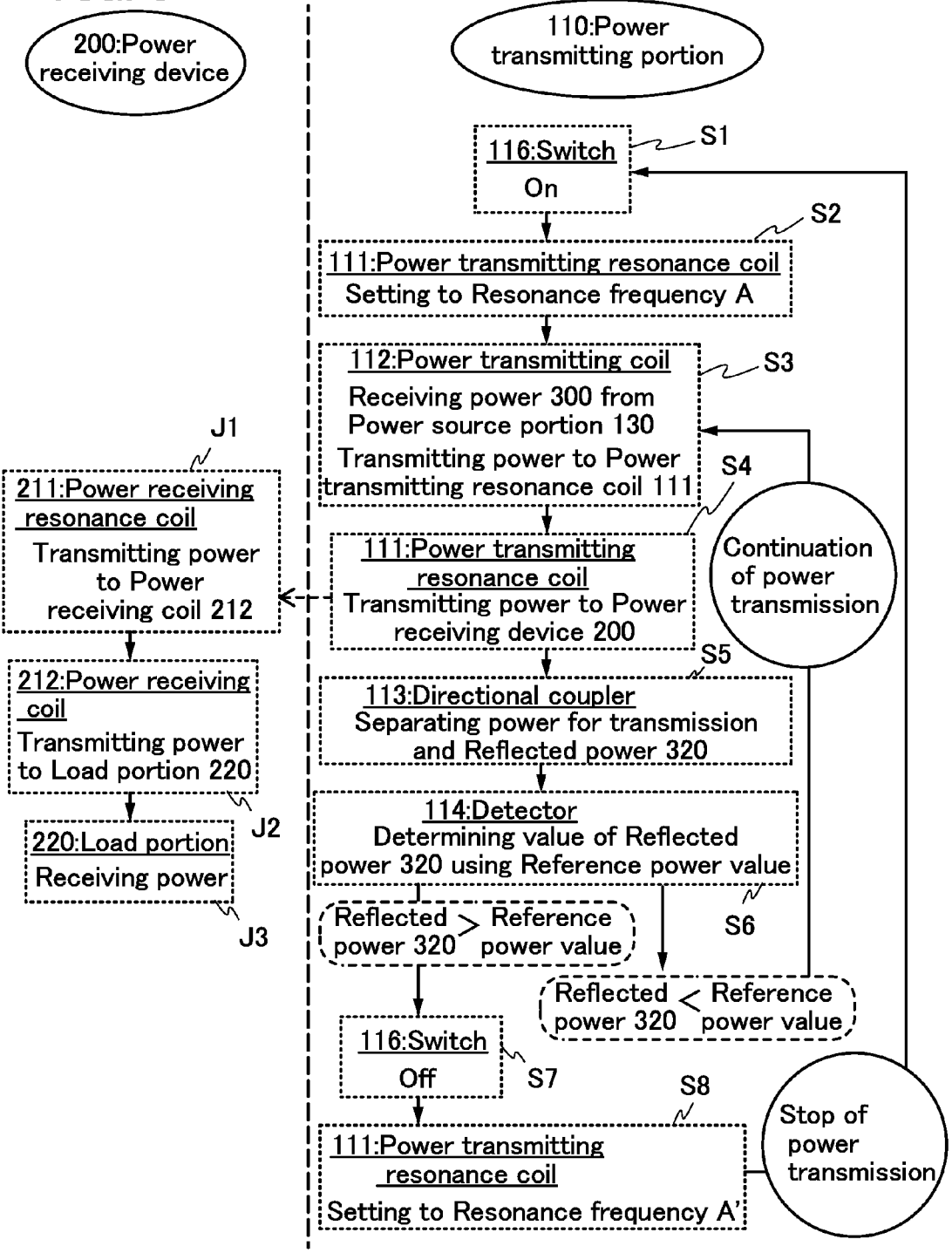

POWER FEEDING SYSTEM AND POWER FEEDING METHOD

BACKGROUND OF THE INVENTION

1. Field of the Invention

The present invention relates to a power feeding system and a power feeding method.

2. Description of the Related Art

In recent years, electronic devices using power as a prime mover, as typified by mobile devices such as mobile phones or notebook personal computers, are often used while being carried. Also, transportation means such as bicycles and automobiles using electric power as a prime mover have been developed from the point of view of environmental cleanness and safety.

Since such portable electronic devices and such transportation means are often used outdoors, it is difficult to constantly supply power from a commercial power supply distributed to each house, through wires. Therefore, the portable electronic devices and the transportation means are provided with batteries which are charged from a commercial power supply in advance and operate by power supply from the batteries.

However, since the amount of power stored in the batteries is finite, users need to recharge the batteries outdoors in order to continue to use the portable electronic devices or the transportation means in the case where power stored in the batteries is exhausted when they are in use outdoors. Accordingly, power feeding service which can be used outdoors has been required in addition to conventional power feeding service with which power is distributed to an indoor commercial power supply.

A power feeding method and a power feeding system having high versatility with which an unspecified number of users can use the power feeding method and the power feeding system and having high supply efficiency with which the amount of supplied power and the speed of power supply become high, which are different from the conventional power feeding service used indoors by certain individuals, are needed for power feeding service given outdoors.

Therefore, a wireless power feeding method in which power feeding is performed wirelessly has been researched in addition to a conventional wired power feeding method using a wire. As the wireless power feeding method, for example, an electromagnetic coupling method (also referred to as an electromagnetic induction method), an electric wave method (also referred to as a microwave method), and a resonance method (also referred to as a resonant method) have been proposed, and there is a report for a further improvement in efficiency of power transmission (power transmission efficiency) (for example, see Patent Document 1).

REFERENCE

Patent Document

[Patent Document 1] Japanese Published Patent Application No. 2010-119246

SUMMARY OF THE INVENTION

However, since power is transmitted using electromagnetic waves in a wireless power feeding system, the power transmission efficiency is likely to be lowered although power can be fed wirelessly.

Further, there is a problem in that it is difficult to specify and manage a power feeding provider which transmits power (a power transmitting side or a power transmitting device) and a power feeding user which receives power (a power receiving side or a power receiving device) or it is difficult for them to specify and manage each other.

An object of one embodiment of the present invention is to provide a power feeding system and a power feeding method in which a power feeding provider (a power transmitting device) can supply power to a power feeding user (a power receiving device) with high power transmission efficiency.

Another object of one embodiment of the present invention is to provide a power feeding system and a power feeding method in which a power feeding provider (a power transmitting device) can have a high power supply ability to offer power feeding service to more power feeding users (power receiving devices) in a shorter time.

Another object of one embodiment of the present invention is to provide a power feeding system and a power feeding method which are more convenient for a power feeding user (a power receiving device).

Another object of one embodiment of the present invention is to provide a power feeding system and a power feeding method which can offer a power feeding service which is efficient to both a power feeding user and a power feeding provider.

A power feeding system and a power feeding method which are disclosed in this specification are a wireless power feeding system and a wireless power feeding method, respectively, which use a resonance method (also referred to as resonant method) using a power transmitting device which detects the power feeding state and includes a plurality of adjacently provided power transmitting portions each of which independently controls the start, the continuation, and the stop of power transmission to a power receiving device. Power feeding from the power transmitting device to the power receiving device is performed using a magnetic resonance phenomenon between resonance coils which are included in the power transmitting portion and a power receiving portion and have the same resonance frequency.

The resonance frequency of the power transmitting resonance coil included in the power transmitting portion of the power transmitting device can be set to a first resonance frequency which is the same as the resonance frequency of the power receiving resonance coil included in the power receiving portion of the power receiving device or a second resonance frequency which is different from the resonance frequency of the power receiving resonance coil. Power transmission is started by setting the resonance frequency of the power transmitting resonance coil to the first resonance frequency, and power transmission is stopped by setting the resonance frequency of the power transmitting resonance coil to the second resonance frequency.

First, the resonance frequencies of all the power transmitting resonance coils are set to the first resonance frequency, and thus power transmission is started. The power transmission state in each of the power transmitting portions is monitored, the power transmitting portion having the highest power transmission efficiency (the number of the power transmitting portions having the highest power transmission efficiency may be plural) is selected based on positional advantage, and the power transmitting resonance coil included in the selected power transmitting portion is kept at the first resonance frequency, whereby power transmission continues. The resonance frequency of the power transmitting resonance coil included in the non-selected power transmitting portion (the number of the non-selected power transmitting portions may be plural) is set to the second resonance frequency, whereby power transmission is stopped.

One embodiment of a power feeding system disclosed in this specification includes a power transmitting device including a plurality of adjacent power transmitting portions and a power source portion which is electrically connected to the plurality of power transmitting portions; and a power receiving device including a power receiving portion and a load portion which is electrically connected to the power receiving portion. The plurality of adjacent power transmitting portions which are included in the power transmitting device each include a power transmitting coil configured to be supplied with power from the power source portion; a power transmitting resonance coil which is not in contact with the power transmitting coil and is electromagnetically coupled with the power transmitting coil by electromagnetic induction; a directional coupler which inputs reflected power reflected from the power transmitting resonance coil to a detector; the detector which determines the value of the reflected power using a reference power value; and a switch to which an output from the detector is input. The power receiving portion in the power receiving device includes a power receiving coil which supplies power to the load portion; and a power receiving resonance coil which is not in contact with the power receiving coil and is electromagnetically coupled with the power receiving coil by electromagnetic induction. The resonance frequency of the power transmitting resonance coil is set to the first resonance frequency or the second resonance frequency by turning on or off the switch. The resonance frequency of the power receiving resonance coil is either the first resonance frequency or the second resonance frequency.

Another embodiment of a power feeding system disclosed in this specification includes, in the above structure, a capacitor for adjusting the resonance frequency on the power transmitting side which is electrically connected to the power transmitting resonance coil and the switch in the power transmitting portion; and a capacitor for adjusting the resonance frequency on the power receiving side in the power receiving portion.

One embodiment of a power feeding method disclosed in this specification includes a first step of setting the resonance frequencies of power transmitting resonance coils in a plurality of power transmitting portions to a first resonance frequency; a second step of transmitting power which is supplied from power source portions to power transmitting coils to the power transmitting resonance coils; a third step of transmitting the power from the power transmitting resonance coils to a power receiving device; a fourth step of inputting reflected power which is reflected by the power transmitting resonance coils in the third step to detectors through directional couplers; and a fifth step of determining the values of the reflected power using a reference power value. A first power transmitting portion whose reflected power is determined to be smaller than the reference power value in the fifth step continues power transmission and repeats the third to fifth steps. In a second power transmitting portion whose reflected power is determined to be larger than the reference power value in the fifth step, the resonance frequency of the power transmitting resonance coil is set to a second resonance frequency and power transmission to the power receiving device is stopped.

According to another embodiment of a power feeding method disclosed in this specification, the second power transmitting portion which has stopped power transmission to the power receiving device by setting the resonance frequency of the power transmitting resonance coil to the second resonance frequency repeats the first to fifth steps after a predetermined period of time in the above structure.

According to another embodiment of a power feeding method disclosed in this specification, in the above structure, setting the resonance frequency of the power transmitting resonance coil to the first resonance frequency or the second resonance frequency is controlled by the switch which is turned on or off by a signal input from the detector.

According to one embodiment of the present invention, a power feeding system and a power feeding method using a resonance method in which a power transmitting region (a region from which power can be supplied) is increased and power can be supplied with high power transmission efficiency (high power supply efficiency) can be provided by using a power transmitting device including a plurality of power transmitting portions each including a power transmitting resonance coil.

According to another embodiment of the present invention, a power feeding system and a power feeding method in which a power feeding provider (a power transmitting device) can have a high power supply ability to offer power feeding service to more power feeding users (power receiving devices) in a shorter time can be provided.

According to another embodiment of the present invention, a highly convenient power feeding system and a highly convenient power feeding method can be provided because power feeding users (power receiving devices) can have more usage modes; for example, the users can receive power while moving and the use efficiency is improved because of shortening of a power reception time.

According to another embodiment of the present invention, a power feeding system and a power feeding method in which a power feeding provider (a power transmitting device) and a power feeding user (a power receiving device) can be specified or managed or can specify and manage each other and which enables a variety of safe power feeding services from the power feeding provider (the power transmitting device) to the power feeding user (the power receiving device) can be provided.

According to another embodiment of the present invention, a power feeding system and a power feeding method which can offer a power feeding service which is efficient to both a power feeding user and a power feeding provider can be provided.

BRIEF DESCRIPTION OF THE DRAWINGS

In the accompanying drawings:

FIGS. 2A to 2C are views illustrating one embodiment of a power feeding system;

FIG. 5 is a view illustrating one embodiment of a power feeding method; and

DETAILED DESCRIPTION OF THE INVENTION

Figure 1A:
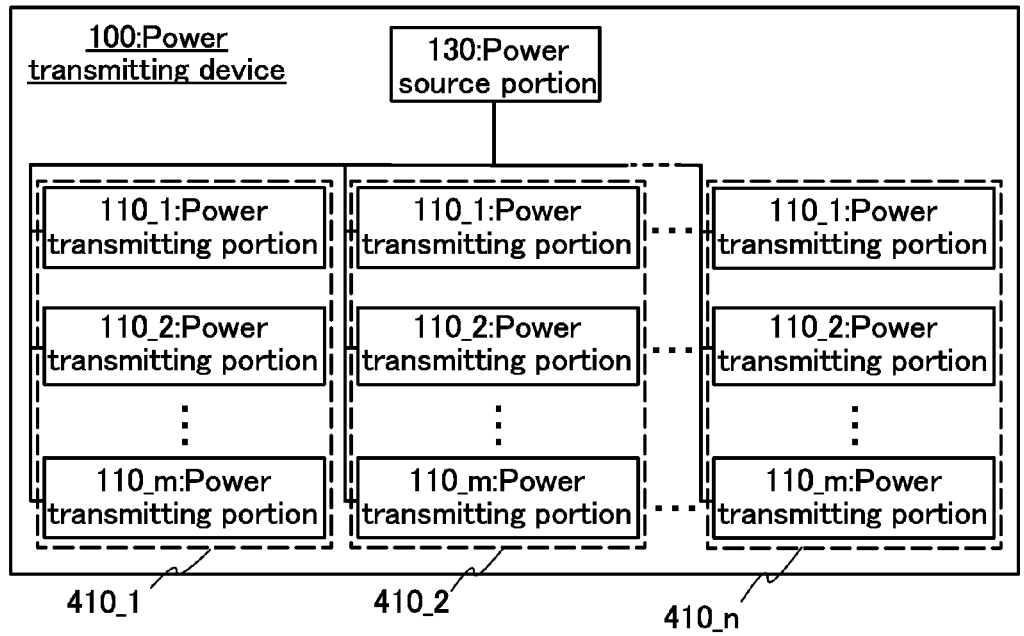
FIGS. 1A to 1C are views illustrating one embodiment of a power feeding system.

Hereinafter, Embodiments are described in detail using the drawings. Note that the present invention is not limited to the description of the embodiments, and it is apparent to those skilled in the art that modes and details can be modified in various ways without departing from the spirit of the present invention disclosed in this specification and the like. A structure of the different embodiment can be implemented by combination appropriately. Note that in the structures of the present invention described below, the same portions or portions having a similar function are denoted by the same reference numerals, and the repeated description thereof is omitted.

Note that the position, the size, the range, or the like of each structure illustrated in drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not limit the components numerically.

Embodiment 1

In this embodiment, embodiments of a power feeding system and a power feeding method are described with reference to FIGS. 1A to 1C, FIGS. 2A to 2C, FIGS. 3A to 3C, FIG. 4, and FIG. 5.

First, a power feeding system which is one embodiment of the present invention is described below with reference to FIGS. 1A to 1C, FIGS. 2A to 2C, and FIGS. 3A to 3C.

Figure 1B:
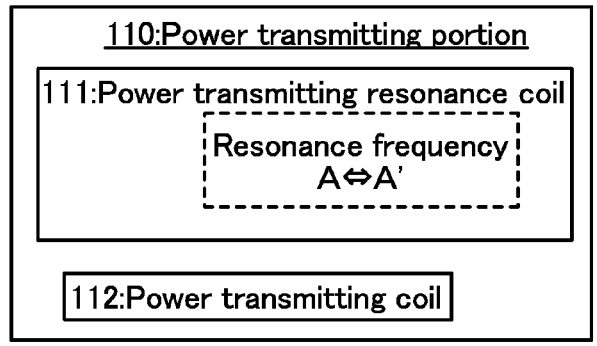
Figure 1C:
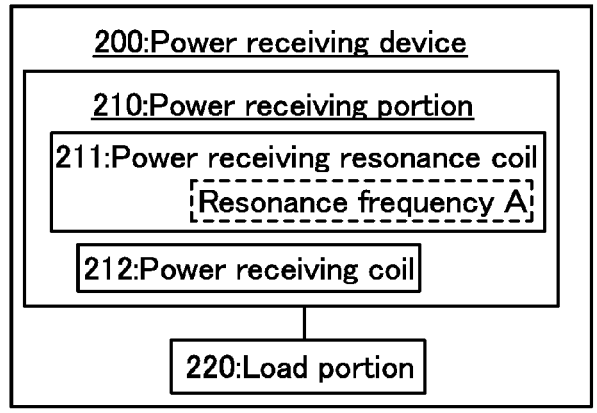

FIGS. 1A and 1B are block diagrams illustrating a structure of a power transmitting device which is included in the power feeding system, and FIG. 1C is a block diagram illustrating a structure of a power receiving device which is included in the power feeding system. However, a component and a function are not necessarily in a one-to-one relation, and a power feeding system may operate by relating a plurality of components and a plurality of functions to each other.

In the power feeding system in this embodiment, power is supplied from the power transmitting device which is electrically connected to the power source portion to the power receiving device wirelessly. Although there is no particular limitation on a shape or an arrangement of a plurality of power transmitting portions, an example in which the plurality of power transmitting portions are arranged in matrix is described in this embodiment.

A power transmitting device 100 illustrated in FIG. 1A includes n power transmitting portion groups 410 (410_1 to 410_n) (n is a natural number) arranged horizontally. The power transmitting portion groups 410_1 to 410_n each include m power transmitting portions 110 (110_1 to 110_m) (m is a natural number) arranged vertically. The power transmitting portions 110 (110_1 to 110_m) which are provided in the power transmitting portion groups (410_1 to 410_n) are electrically connected to a power source portion 130 which is provided in the power transmitting device 100. Note that in this specification and the drawings, components having a similar function are distinguished by "_1", "_2", and the like added to the end of their names.

There is no particular limitation on a structure of connection between the power transmitting portions 110 (110_1 to 110_m) and the power source portion 130 in the power transmitting device 100. The plurality of power transmitting portions 110 (110_1 to 110_m) which are electrically connected to each other (for example, the power transmitting portion group 410_1) may be connected to the power source portion 130. Alternatively, each of the power transmitting portions 110 (110_1 to 110_m) may be independently connected to the power source portion 130.

A power receiving device 200 in FIG. 1C includes a power receiving portion 210 including a power receiving resonance coil 211 and a power receiving coil 212, and a load portion 220 which is electrically connected to the power receiving portion 210. The resonance frequency of the power receiving resonance coil 211 is Resonance frequency A. The resonance frequency of the power receiving resonance coil 211 in this embodiment is determined in manufacture depending on the material and the shape of the coil and the circuit configuration of a capacitor or the like and is constant.

FIG. 1B illustrates the power transmitting portion 110 (each of the power transmitting portions 110_1 to 110_m) in detail. The power transmitting portion 110 includes a power transmitting resonance coil 111 and a power transmitting coil 112. The resonance frequency of the power transmitting resonance coil 111 can be set to Resonance frequency A or Resonance frequency A' by electrically switching Resonance frequency A and Resonance frequency A'.

FIGS. 2A to 2C illustrate specific examples of the power transmitting portion 110 and the power receiving portion 210.

The power transmitting portion 110 illustrated in FIG. 2A includes the power transmitting resonance coil 111 and the power transmitting coil 112, a directional coupler 113, a detector 114, a capacitor 115 for adjusting the resonance frequency, and a switch 116.

The power transmitting coil 112 is electrically connected to the power source portion 130 through the directional coupler 113, and power 300 is supplied from the power source portion 130.

Further, the power transmitting coil 112 is electromagnetically coupled with the power transmitting resonance coil 111 by electromagnetic induction, and the power 300 supplied from the power source portion 130 is supplied to the power transmitting resonance coil 111 through the power transmitting coil 112.

The directional coupler 113 is electrically connected to the detector 114, and the detector 114 is electrically connected to the switch 116.

Although the power 300 supplied to the power transmitting resonance coil 111 is transmitted to the power receiving device 200, not all the power 300 is transmitted depending on the power feeding state. The power which has not been transmitted is reflected as reflected power 320 from the power transmitting resonance coil 111 to the power transmitting coil 112.

The directional coupler 113 transmits the reflected power 320 to the detector 114. The detector 114 is a circuit which outputs a value of the reflected power input from the directional coupler 113 as a binary signal ("0" or "1") by using a power value which is set in advance as a reference.

As the detector 114, a pulse-height discriminator can be used, for example.

The switch 116 is provided in order to control the resonance frequency of the power transmitting resonance coil 111. When the switch 116 is turned on, the resonance frequency of the power transmitting resonance coil 111 is set to Resonance frequency A. Resonance frequency A of the power transmitting resonance coil 111 which is obtained when the switch 116 is in an on state can be obtained by determining the shape and the material of the power transmitting resonance coil 111 and the capacitance of the capacitor 115 for adjusting the resonance frequency as appropriate.

On the other hand, Resonance frequency A' of the power transmitting resonance coil 111 which is obtained when the switch 116 is in an off state is preferably set to a value which is largely different from Resonance frequency A, for example, a sufficiently large value. For example, in the case where Resonance frequency A is 13.56 MHz, Resonance frequency A' of the power transmitting resonance coil 111 which is obtained when the switch 116 is in an off state is preferably approximately 100 MHz.

FIG. 2C illustrates another example of the power transmitting portion 110. The power transmitting portion 110 illustrated in FIG. 2C includes a switch 117 between the directional coupler 113 and the power source portion 130.

Provision of the switch 117 enables control of power supply from the power source portion 130 to the power transmitting coil 112. In the power transmitting portion 110 illustrated in FIG. 2A, power is constantly supplied from the power source portion 130 to the power transmitting coil 112. In the case where power is not transmitted, power supply from the power source portion 130 to the power transmitting coil 112 can be stopped by turning off the switch 117 in the power transmitting portion 110 illustrated in FIG. 2C. When each of the power transmitting portions 110 can select whether or not power is supplied from the power source portion 130, power can be supplied to only the power transmitting portion 110 which needs to transmit power at this moment, and power supply to the power transmitting portion 110 which does not need to transmit power at this moment can be stopped, so that power consumption of the power transmitting device 100 can be reduced. Note that in the power transmitting device 100, the number of the power transmitting portions which need to transmit power at this moment and the number of the power transmitting portions which do not need to transmit power at this moment may be plural.

The power receiving portion 210 illustrated in FIG. 2B includes the power receiving resonance coil 211 and the power receiving coil 212. In this embodiment, the resonance frequency of the power receiving resonance coil 211 is Resonance frequency A which is determined by determining the shape and the material of the power receiving resonance coil 211 and the capacitance of the capacitor 215 for adjusting the resonance frequency as appropriate at the time of forming the power receiving resonance coil 211.

The power transmitting resonance coil 111 and the power receiving resonance coil 211 are electromagnetically coupled strongly to each other (magnetic resonance coupling) only in the case where the resonance frequencies are the same, and thus the power receiving resonance coil 211 can receive the power 310 from the power transmitting resonance coil 111.

Since the resonance frequency of the power transmitting resonance coil 111 in which the switch 116 is in an on state and the resonance frequency of the power receiving resonance coil 211 are both Resonance frequency A, the power receiving resonance coil 211 can receive the power 310 from the power transmitting resonance coil 111 in which the switch 116 is in an on state.

The power receiving resonance coil 211 is electromagnetically coupled with the power receiving coil 212 by electromagnetic induction, and the power 310 supplied from the power transmitting resonance coil 111 is supplied to the power receiving coil 212 through the power receiving resonance coil 211.

The power receiving coil 212 is electrically connected to the load portion 220. The load portion 220 stores the power 310 which the power receiving coil 212 receives from the power receiving resonance coil 211.

The load portion 220 is a power storage means such as a secondary battery, and for example, a nickel-cadmium battery, a nickel-hydride battery, or a lithium-ion battery can be used.

Figure 3A:
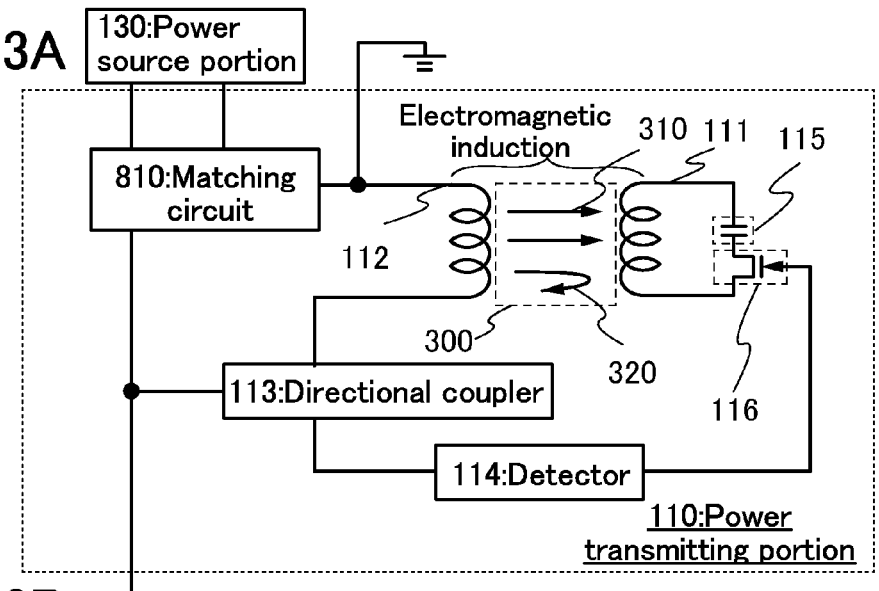
FIGS. 3A to 3C are views illustrating one embodiment of a power feeding system.
Figure 3B:
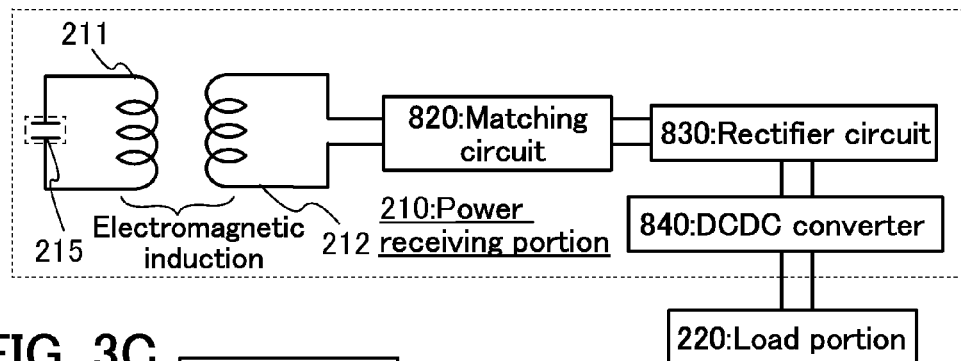
Figure 3C:
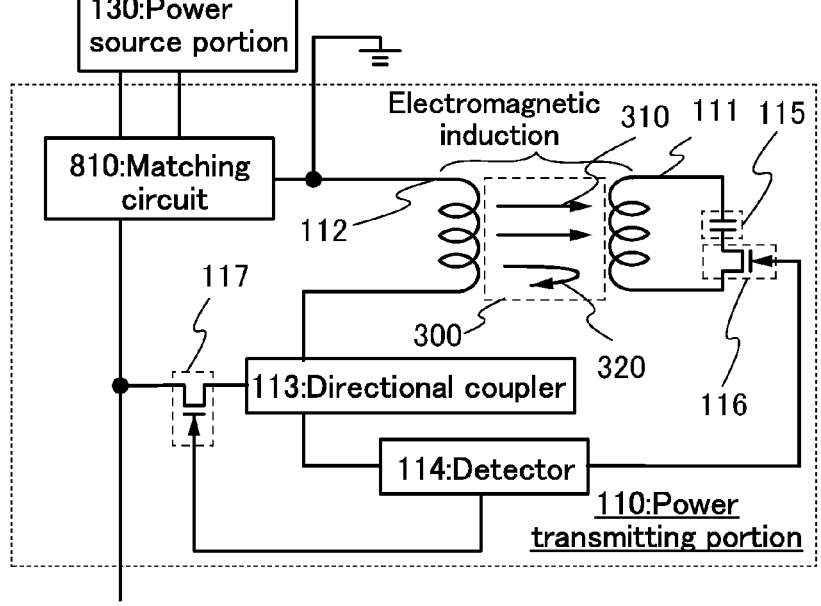

Note that the power transmitting portions 110 illustrated in FIGS. 2A and 2C can be each provided with a matching circuit 810 as appropriate, as illustrated in FIGS. 3A and 3C. Further, the power receiving portion 210 illustrated in FIG. 2B can be provided with a matching circuit 820, a rectifier circuit 830, and a DCDC converter 840 as appropriate, as illustrated in FIG. 3B.

A semiconductor element having switching characteristics (e.g., a transistor) can be used not only for the switch 116 or the switch 117 but also for a circuit such as the power source portion 130, the directional coupler 113, the detector 114, the matching circuit 810, the matching circuit 820, the rectifier circuit 830, the DCDC converter 840, and the load portion 220, which are included in the power transmitting device 100 and the power receiving device 200 used in the power feeding system described in this embodiment.

As a semiconductor material used for the semiconductor element, for example, a silicon based material such as silicon, silicon carbide, or silicon germanium; a compound semiconductor material such as gallium arsenide; and an oxide semiconductor material such as an oxide containing indium (In), gallium (Ga), and zinc (Zn) (an In—Ga—Zn-based oxide) can be given.

The power transmitting device 100 and the power receiving device 200 which are used in the power feeding system are mainly used outdoors; therefore, they are often used in severe temperature environment, particularly, under high temperatures due to a climate or the weather. A semiconductor element (a transistor) including an oxide semiconductor can maintain favorable switching characteristics even in severe high temperature environment. Accordingly, the use of a semiconductor element including an oxide semiconductor enables the power transmitting device 100 and the power receiving device 200 to have high reliability, so that a smooth power feeding service can be offered when the power feeding system and the power feeding method which are described in this embodiment are used.

The above is the power feeding system in this embodiment.

Figure 4:
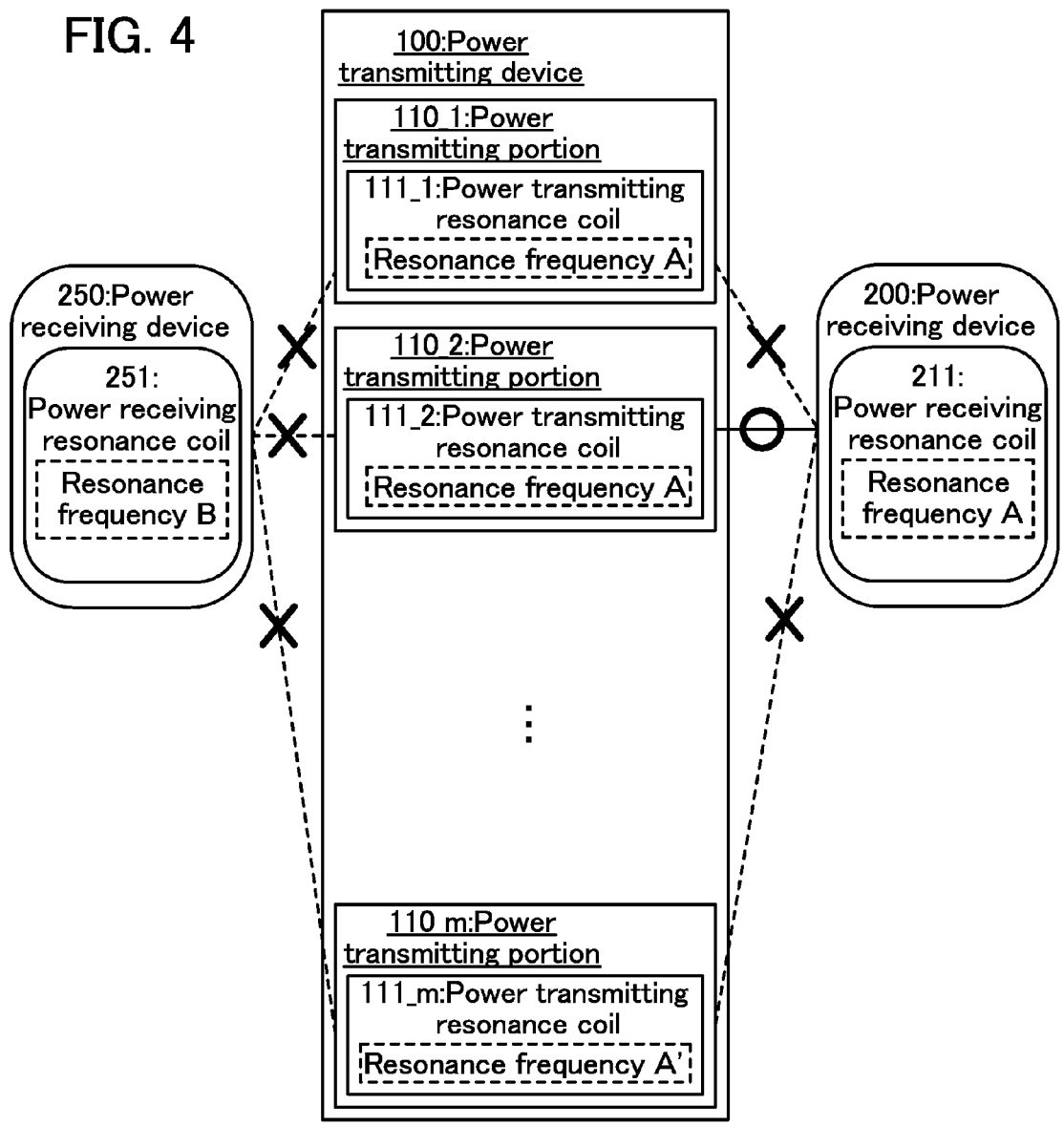
FIG. 4 is a view illustrating one embodiment of a power feeding method.

Next, FIG. 4 is a conceptual diagram showing the power feeding method using the above-described power feeding system.

In the power feeding system and the power feeding method in this embodiment, a resonance method (also referred to as resonant method) using a power transmitting device which detects the power feeding state and includes a plurality of adjacently provided power transmitting portions each of which independently controls the start, the continuation, and the stop of power transmission to a power receiving device is employed. Power feeding from the power transmitting device to the power receiving device is performed using a magnetic resonance phenomenon which is generated between resonance coils which are included in a power transmitting portion and a power receiving portion and have the same resonance frequency.

The power transmitting device in this embodiment includes the plurality of power transmitting portions. In each of the plurality of power transmitting portions, the resonance frequency of the power transmitting resonance coil can be set to both of a first resonance frequency and a second resonance frequency. The resonance frequency of the power transmitting resonance coil can be set to the first resonance frequency or the second resonance frequency by electrically switching the first resonance frequency and the second resonance frequency.

In FIG. 4, the power transmitting device 100 includes the plurality of power transmitting portions 110_1 to 110_m. The plurality of power transmitting portions 110_1 to 110_m include the power transmitting resonance coils 111_1 to 111_m, respectively. The resonance frequency of each of the power transmitting resonance coils 111_1 to 111_m can be set to Resonance frequency A or Resonance frequency A' by electrically switching Resonance frequency A and Resonance frequency A'. A power receiving device 250 including a power receiving resonance coil 251 having Resonance frequency B and a power receiving device 200 including the power receiving resonance coil 211 having Resonance frequency A are provided close to the power transmitting device 100.

In order that the power receiving resonance coil included in the power receiving device can receive power from the power transmitting resonance coil by a magnetic resonance phenomenon, the resonance frequency of the power receiving resonance coil needs to be the same as the first resonance frequency or the second resonance frequency which the power transmitting resonance coil can have.

Accordingly, power is not transmitted from the power transmitting portions 110_1 to 110_m including the power transmitting resonance coils 111_1 to 111_m, respectively, each having Resonance frequency A or Resonance frequency A', to the power receiving device 250 including the power receiving resonance coil 251 having Resonance frequency B because of the different resonance frequencies. Note that in FIG. 4, the case where power is transmitted from the power transmitting portions 110_1 to 110_m to the power receiving device 200 or the power receiving device 250 is indicated by a circle, and the case where power is not transmitted from the power transmitting portions 110_1 to 110_m to the power receiving device 200 or the power receiving device 250 is indicated by a cross mark.

The value of the resonance frequency given to the coil is peculiar to the coil regardless of whether the number of the resonance frequencies is one or more and is determined depending on the shape, the material, or the circuit configuration of the capacitor or the like at the time of forming the power transmitting resonance coil and the power receiving resonance coil. Accordingly, the resonance frequency functions as identification information, and thus the power transmitting device and the power receiving device, and further, a power feeding provider and a power feeding user can be identified and managed or can identify and manage each other based on the identification information. The resonance frequency has high safety because it is determined depending on the physical conditions for manufacturing the coil and is unlikely to be falsified as compared to the case where identification of information is performed by an electrical signal.

In the power feeding service (the power feeding system and the power feeding method) in this embodiment, whether power is fed or not is determined depending on whether the resonance frequencies match or not, and thus the resonance frequencies are the key to power feeding, and resonance coils having a specific resonance frequency are mounted on a power transmitting device and a power receiving device between which a contract for power feeding has been made in advance, whereby only contractants can receive the safe power feeding service. Accordingly, even when a power feeding provider increases the size of the power transmitting device in order to increase the power feeding efficiency and puts the power transmitting device in a place where an unspecified number of power receiving devices (power feeding users) pass or gather, such as a road or a square, the power feeding service can be offered to only specific power receiving devices (power feeding users) by identification with the resonance frequencies.

On the other hand, the power receiving device 200 can receive power from the power transmitting device 100 because the power receiving resonance coil 211 of the power receiving device 200 has Resonance frequency A which the power transmitting resonance coils 111_1 to 111_m included in the power transmitting device 100 can have.

Power transmission starts by setting the resonance frequencies of the power transmitting resonance coils 111_1 to 111_m which are included in the power transmitting portions 110_1 to 110_m in the power transmitting device 100, respectively, to Resonance frequency A (a first resonance frequency) which is the same as the resonance frequency of the power receiving resonance coil 211 included in the power receiving device 200. On the other hand, power transmission stops by setting the resonance frequencies of the power transmitting resonance coils 111_1 to 111_m which are included in the power transmitting portions 110_1 to 110_m, respectively, to Resonance frequency A' which is different from Resonance frequency A of the power receiving resonance coil 211.

The power transmitting device 100 including the plurality of power transmitting portions 110_1 to 110_m as described in this embodiment has a large power transmitting region, and thus can transmit power to a plurality of power receiving devices at the same time or to power receiving devices with a variety of sizes from small to large and a variety of shapes. Accordingly, the following advantages can be obtained: the power transmitting device 100 is convenient for a power receiving device of a power feeding user, and the power transmitting device 100 of a power feeding provider can have high power supply ability to offer power feeding service to more power feeding users (power receiving devices) in a shorter time.

Further, in power feeding using the resonance method, unlike power feeding using an electromagnetic coupling method, power is transmitted, power is transmitted only in a state where the resonance frequency of the power receiving resonance coil 211 is the same as the resonance frequencies of one or more of the power transmitting resonance coils 111_1 to 111_m, so that power loss at the time of power feeding can be lowered.

However, the power transmitting device 100 including the plurality of power transmitting portions 110_1 to 110_m which is described in this embodiment has a structure in which the power transmitting resonance coils 111_1 to 111_m which are provided in the power transmitting portions 110_1 to 110_m, respectively, are provided close to each other, and thus a magnetic resonance phenomenon occurs between any two of the plurality of power transmitting resonance coils 111_1 to 111_m, which causes transmission and reception of power between any two of the plurality of power transmitting resonance coils 111_1 to 111_m. Such transmission and reception of power between any two of the power transmitting portions 110_1 to 110_m causes loss of power which is to be transmitted to the power receiving device 200, resulting in a reduction in efficiency of power transmission from the power transmitting device 100 to the power receiving device 200.

Therefore, in the power feeding system and the power feeding method in this embodiment, only the resonance frequency of the power transmitting resonance coil 111_2 which is closest to the power receiving resonance coil 211 and has high power transmission efficiency is set to Resonance frequency A which is the same as the resonance frequency of the power receiving resonance coil 211, and the resonance frequencies of the power transmitting resonance coils 111_1 and 111_3 to 111_m are set to Resonance frequency A' which is different from Resonance frequency A of the power receiving resonance coil 211.

Only the power transmitting portion 110_2 including the power transmitting resonance coil 111_2 whose resonance frequency is set to Resonance frequency A which is the same as the resonance frequency of the power receiving resonance coil 211 continues power transmission to the power receiving device 200, and the power transmitting portions 110_1 and 110_3 to 110_m including the power transmitting resonance coils 111_1 and 111_3 to 111_m whose resonance frequencies are set to Resonance frequency A' different from the resonance frequency of the power receiving resonance coil 211 stop power transmission to the power receiving device 200.

Accordingly, since Resonance frequency A of the power transmitting resonance coil 111_2 which transmits power is different from Resonance frequency A' of each of the power transmitting resonance coils 111_1 and 111_3 to 111_m which are provided adjacent to and in the periphery of the power transmitting resonance coil 111_2, transmission and reception of power due to a magnetic resonance phenomenon does not occur between any two of the power transmitting resonance coils 111_1 to 111_m. Thus, power can be fed from the power transmitting device 100 to the power receiving device 200 with high power transmission efficiency.

Switching from Resonance frequency A of the power receiving resonance coil 211 to Resonance frequency A' different from Resonance frequency A can be controlled by detecting, in each of the power transmitting portions 110, the reflected power 320 which is not transmitted to the power receiving resonance coil 211 and is reflected from any of the power transmitting resonance coils 111_1 to 111_m and performing determination using a reference power value which is set in advance.

Further, the positional relation between the power transmitting device 100 and the power receiving device 200 at the start of power feeding, in the middle thereof, and at the end thereof may be changed depending on the usage mode of power feeding in the case where power feeding is performed while the power receiving device 200 is being moved, for example, the case where the power receiving device 200 is a portable power receiving device or a moving means such as a car. In this case, the power transmission efficiency of the power transmitting portion 110_2 including the power transmitting resonance coil 111_2 changes over time.

Therefore, after the resonance frequencies of the power transmitting resonance coils 111_1 and 111_3 to 111_m are set to Resonance frequency A' different from the resonance frequency of the power receiving resonance coil 211, the resonance frequencies of the power transmitting resonance coils 111_1 and 111_3 to 111_m are set to Resonance frequency A which is the same as the resonance frequency of the power receiving resonance coil 211 every predetermined period, and setting to Resonance frequency A or Resonance frequency A' is controlled by detecting the current reflected power 320 and performing determination, and thus whether power is transmitted or not is determined.

Next, the power feeding method using the power feeding system is described with reference to a flow chart in FIG. 5.

FIG. 5 illustrates an example of the power feeding system and the power feeding method in which power is fed from the power transmitting portion 110 which is one of the plurality of power transmitting portions 110_1 to 110_m included in the power transmitting device 100 to the power receiving device 200.

First, the switch 116 in the power transmitting portion 110 is turned on so that power can be transmitted to the power receiving device 200 (S1). The resonance frequency of the power transmitting resonance coil 111 is set to Resonance frequency A in accordance with the on state of the switch 116 (S2).

The power transmitting coil 112 receives the power 300 from the power source portion 130 and transmits the power 300 to the power transmitting resonance coil 111 which is electromagnetically coupled with the power transmitting coil 112 by electromagnetic induction (S3). In the case where the resonance frequency of the power receiving resonance coil 211 is Resonance frequency A and the resonance frequencies of the power transmitting resonance coil 111 and the power receiving resonance coil 211 are the same (in the case where the resonance frequency of the power receiving resonance coil 211 included in the power receiving portion 210 of the power receiving device 200 is Resonance frequency A as in FIG. 4), the power transmitting resonance coil 111 transmits the received power 300 to the power receiving device 200 (S4).

The power receiving resonance coil 211 in the power receiving portion 210 of the power receiving device 200 receives the transmitted power 300 and transmits the power 300 to the power receiving coil 212 which is electromagnetically coupled with the power receiving resonance coil 211 by electromagnetic induction (J1).

The power receiving coil 212 transmits the received power 300 to the load portion 220 (J2), and the load portion 220 receives the power 300 (J3). Thus, power can be fed from the power transmitting portion 110 of the power transmitting device 100 to the power receiving device 200.

For example, in the case where the resonance frequency of the power receiving resonance coil is Resonance frequency C and the resonance frequencies of the power transmitting resonance coil 111 and the power receiving resonance coil are not the same, magnetic resonance coupling does not occur between the power transmitting resonance coil 111 and the power receiving resonance coil, and thus the power transmitting resonance coil 111 does not transmit power to the power receiving resonance coil, and the power 300 transmitted from the power transmitting coil 112 is reflected as the reflected power 320 to the power transmitting coil 112.

Further, in the case where the power transmitting resonance coil 111 and the power receiving resonance coil 211 are not close to each other even if the resonance frequency of the power receiving resonance coil 211 is Resonance frequency A and the resonance frequencies of the power transmitting resonance coil 111 and the power receiving resonance coil 211 are the same, the power transmission efficiency is decreased, and thus the power transmitting resonance coil 111 transmits only power 310 which is part of the power 300 and reflects the power 300 excluding the power 310 to the power transmitting coil 112 as the reflected power 320.

The directional coupler 113 provided between the power source portion 130 and the power transmitting coil 112 separates the reflected power 320 and power for transmission which is supplied from the power source portion 130 (S5) and transmits the reflected power 320 to the detector 114.

The detector 114 is a circuit which determines the value of the power. The detector 114 determines the value of the reflected power 320 using a reference power value which is set in advance (S6). For example, "0" (Low) is output in the case where the value smaller than the reference power value is input as the value of the reflected power 320, and "1" (High) is output in the case where the value larger than the reference power value is input as the value of the reflected power 320. Note that the detector 114 can determine the value of the power by determining voltage, current, or both the voltage and the current.

Since the reflected power 320 is power which has not transmitted from the power transmitting resonance coil 111 to the power receiving resonance coil 211, it can be determined that the smaller the reflected power 320 is, the higher the efficiency of power transmission from the power transmitting portion 110 to the power receiving device 200 is, and as the larger the reflected power 320 is, the lower the power transmission efficiency is.

Accordingly, in the case where the following relation is satisfied: reflected power 320< reference power, that is, in the case where "0" (Low) is output from the detector 114 and the value of the reflected power 320 is smaller than that of the reference power value, the power transmission efficiency is high, and thus continuation of power transmission is determined (return to S3 in FIG. 5). Accordingly, the switch 116 remains on and the power transmitting resonance coil 111 is kept at Resonance frequency A.

In contrast, in the case where the following relation is satisfied: reflected power 320> reference power, that is, in the case where "1" (High) is output from the detector 114 and the value of the reflected power 320 is larger than that of the reference power value, the power transmission efficiency is low, and thus stop of power transmission is determined. Accordingly, the switch 116 is turned off (S7), the resonance frequency of the power transmitting resonance coil 111 is switched to Resonance frequency A' from Resonance frequency A (S8), and power transmission is stopped.

In the power transmitting portion 110 where power transmission has been stopped, the switch 116 is turned on again after a predetermined period of time (S1), the power transmission state is determined based on the value of the reflected power 320 so that whether power is transmitted or not is determined.

Thus, power can be transmitted (power can be supplied) from the power transmitting device 100 to the power receiving device 200 with higher power transmission efficiency (high power supply efficiency) in consideration of a change over time in the positional relation between the power receiving device 200 and the power transmitting device 100.

The above is the power feeding method described in this embodiment.

As described above in this embodiment, a power feeding system and a power feeding method using a resonance method in which a power transmitting region (a region from which power can be supplied) is increased and power can be supplied with high power transmission efficiency (high power supply efficiency) can be provided using a power transmitting device including a plurality of power transmitting portions each including a power transmitting resonance coil.

Further, a power feeding system and a power feeding method in which a power feeding provider (a power transmitting device) can have a high power supply ability to offer power feeding service to more power feeding users (power receiving devices) in a shorter time can be provided.

Further, a highly convenient power feeding system and a highly convenient power feeding method can be provided because power feeding users (power receiving devices) can have more usage modes; for example, the users can receive power while moving and the use efficiency is improved because of shortening of a power reception time.

Furthermore, a power feeding system and a power feeding method in which a power feeding provider (a power transmitting device) and a power feeding user (a power receiving device) can be specified and managed or can specify and manage each other and which enable a variety of safe power feeding services from the power feeding provider (the power transmitting device) to the power feeding user (the power receiving device) can be provided.

It is possible to provide a power feeding system and a power feeding method which can offer a power feeding service which is efficient to both a power feeding user and a power feeding provider.

This embodiment can be implemented in appropriate combination with any of the structures described in the other embodiment.

Embodiment 2

In this embodiment, one embodiment in a case where the power receiving device is incorporated in an electric propulsion vehicle such as an electric vehicle in the power feeding system and the power feeding method which are described in Embodiment 1 will be described with reference to FIGS. 6A and 6B.

Note that the power receiving device can be incorporated in portable electronic devices such as digital video cameras, portable information terminals (e.g., mobile computers, mobile phones, portable game consoles, and e-book readers), and image reproducing devices including a recording medium (specifically digital versatile disc (DVD) reproducing devices) in addition to an electric propulsion vehicle such as an electric vehicle. Power can be fed to the electronic devices, in each of which the power receiving device is incorporated, in such a manner that the electronic devices are held and placed in a region capable of power feeding by users.

The power feeding system and the power feeding method in this embodiment can be used for any object that can be driven by electric power.

Figure 6A:
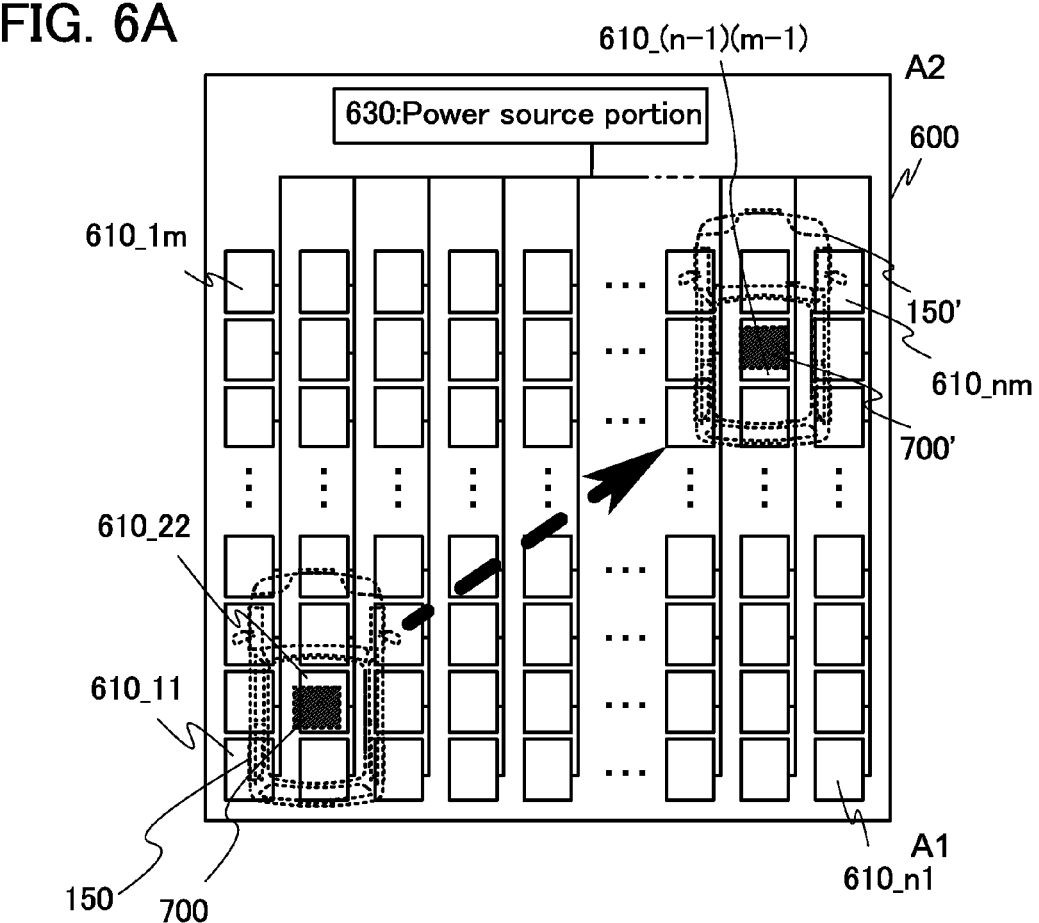
FIGS. 6A and 6B are views illustrating an example of power feeding using a power feeding system.
Figure 6B:
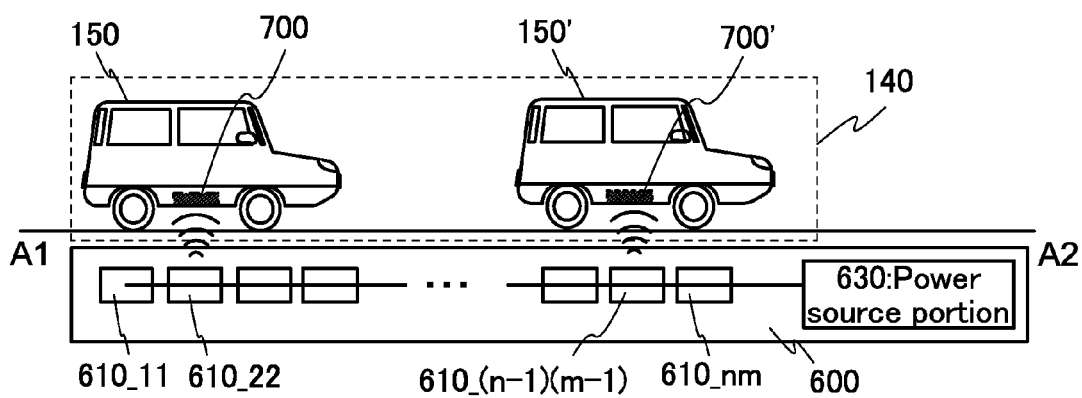

FIGS. 6A and 6B illustrate an example of feeding power to an electric vehicle 150 that is an electric propulsion vehicle by the power feeding system and the power feeding method which are described in Embodiment 1.

Note that FIG. 6A is a top view illustrating the state of power feeding and FIG. 6B is a side view taken along line A1-A2 in FIG. 6A.

A power feeding system illustrated in FIGS. 6A and 6B includes a power transmitting device 600 including a plurality of power transmitting portions $610\_11$ to $610\_nm$ which are arranged in matrix and a power source portion 630; and the electric vehicle 150 including a power receiving device 700. An electric vehicle 150' including a power receiving device 700' is the electric vehicle 150 which has moved. Note that here, the power transmitting device 600 is provided on the ground.

The power transmitting device 600 includes the plurality of power transmitting portions $610\_11$ to $610\_nm$. The plurality of power transmitting portions $610\_11$ to $610\_nm$ each include a power transmitting resonance coil whose resonance frequency can be set to Resonance frequency D or Resonance frequency D' by being electrically switched.

The electric vehicle 150 including the power receiving device 700 which includes a power receiving resonance coil having Resonance frequency D is placed in a power transmitting region including the plurality of power transmitting portions $610\_11$ to $610\_nm$ in the power transmitting device 600. In this embodiment, the case in which a user of the electric vehicle 150 and a provider of the power transmitting device 600 have a contractual relationship with each other and the electric vehicle 150 includes, in advance, the power receiving device 700 including the power receiving resonance coil having Resonance frequency D which is the same as the resonance frequency of the power transmitting resonance coil included in the power transmitting device 600 so that power can be fed to the electric vehicle 150 by the power transmitting device 600 is described.

The value of Resonance frequency D given to the coil is peculiar to the coil regardless of whether the number of the resonance frequencies is one or more and is determined depending on the shape and the material of the coil and a circuit configuration of a capacitor or the like at the time of forming the power transmitting resonance coil and the power receiving resonance coil. Accordingly, Resonance frequency D functions as identification information, and thus the power transmitting device 600 and the power receiving device 700, and further, a power feeding provider and a power feeding user can be identified and managed or can identify and manage each other based on the identification information. Resonance frequency D has high safety because it is determined depending on the physical conditions for manufacturing the coil and is unlikely to be falsified as compared to the case where identification of information is performed by an electrical signal.

The resonance coils having Resonance frequency D are mounted on the power transmitting device 600 and the power receiving device 700 between which a contract for power feeding has been made in advance, whereby only contractants can receive safe power feeding service. Accordingly, even when a power feeding provider increases the size of a power transmitting device like the power transmitting device 600 and puts the power transmitting device on a road or in parking where an unspecified number of power receiving devices (power feeding users) pass or park, the power feeding service can be offered to only the specific electric vehicle 150 including the power receiving device 700 by identification with the resonance frequencies.

The large-sized power transmitting device 600 including the plurality of power transmitting portions 610_11 to 610_nm as described in this embodiment can provide a large power transmitting region, and thus can transmit power to an electric propulsion vehicle and an electronic device each including a plurality of power receiving devices or to an electric propulsion vehicle and an electronic device including power receiving devices with a variety of sizes from small to large and a variety of shapes at the same time. Accordingly, the following advantages can be obtained: the power transmitting device 600 is convenient for a power feeding user (an electric propulsion vehicle and an electronic device each including a power receiving device), and a power feeding provider (the power transmitting device 600) can have high power supply ability to offer power feeding service to more power feeding users (electric propulsion vehicles and electronic devices each including a power receiving device) in a shorter time.

First, power is fed from the power transmitting device 600 to the electric vehicle 150 including the power receiving device 700.

Power transmission can be started by setting the resonance frequencies of the power transmitting resonance coils, which are included in the power transmitting portions 610_11 to 610_nm in the power transmitting device 600, to Resonance frequency D which is the same as the resonance frequency of the power receiving resonance coil which is included in the power receiving device 700, and power transmission can be stopped by setting the resonance frequencies of the power transmitting resonance coils which are included in the power transmitting portions 610_11 to 610_nm to Resonance frequency D' which is different from Resonance frequency D of the power receiving resonance coil.

In the power feeding system and the power feeding method in this embodiment, only the resonance frequency of the power transmitting resonance coil of the power transmitting portion 610_22 which is closest to the power receiving resonance coil included in the power receiving device 700 and has high power transmission efficiency is set to Resonance frequency D which is the same as the resonance frequency of the power receiving resonance coil included in the power receiving device 700, and the resonance frequencies of the power transmitting resonance coils other than the power transmitting resonance coil of the power transmitting portion 610_22 are set to Resonance frequency D' which is different from Resonance frequency D of the power receiving resonance coil.

Only the power transmitting portion 610_22 of the power transmitting portions 610_11 to 610_nm, which includes the power transmitting resonance coil whose resonance frequency is set to Resonance frequency D which is the same as the resonance frequency of the power receiving resonance coil included in the power receiving device 700, continues power transmission to the power receiving device 700, and the power transmitting portions including the power transmitting resonance coils whose resonance frequencies are set to Resonance frequency D' different from the resonance frequency of the power receiving resonance coil stop power transmission to the power receiving device 700.

Accordingly, since Resonance frequency D of the power transmitting resonance coil of the power transmitting portion 610_22 which needs to transmit power at this moment is different from Resonance frequency D' of each of the power transmitting resonance coils included in the power transmitting portions which are provided adjacent to and in the periphery of the power transmitting portion 610_22, transmission and reception of power due to a magnetic resonance phenomenon do not occur between the power transmitting resonance coil of the power transmitting portion 610_22 and any of the adjacent power transmitting resonance coils. Thus, power can be fed from the power transmitting device 600 to the power receiving device 700 with high power transmission efficiency.

Switching from Resonance frequency D of the power transmitting resonance coil, which is the same as the resonance frequency of the power receiving resonance coil, to Resonance frequency D' different from Resonance frequency D can be controlled by detecting, in each of the power transmitting portions 610_11 to 610_nm, reflected power which is not transmitted to the power receiving resonance coil in the power receiving device 700 and is reflected from any of the power transmitting resonance coils and performing determination using a reference power value which is set in advance.

Next, an example of performing power feeding while the electric vehicle 150 is moving is described. The electric vehicle 150 moves to a place where the electric vehicle 150' is illustrated. When the electric vehicle 150 moves to the place where the electric vehicle 150' is illustrated, the positional relation between the power transmitting device 600 and the power receiving device 700 is changed. In this case, the power transmission efficiency of the power transmitting portion 610_22 including the power transmitting resonance coil changes over time.

In the power transmitting device 600 in this embodiment, the power transmission efficiency of all the power transmitting portions 610_11 to 610_nm which are transmitting power or are not transmitting power is checked at least at regular intervals by detecting the reflected power to monitor the power transmission state of each of the power transmitting portions 610_11 to 610_nm.

As the electric vehicle 150 moves to the place where the electric vehicle 150' is illustrated, the power receiving device 700 is more distant from the power transmitting portion 610_22, and thus the power transmission efficiency of the power transmitting portion 610_22 is decreased. When the power transmission efficiency of the power transmitting portion 610_22 becomes lower than a certain reference value, the resonance frequency of the power transmitting resonance coil is switched to Resonance frequency D', and power transmission to the power receiving device 700 is stopped.

In contrast, as the electric vehicle 150 moves to the place where the electric vehicle 150' is illustrated, any of the power transmitting portions excluding the power transmitting portion 610_22, to which the power receiving device 700 comes close and through which the power receiving device 700 passes, starts and continues power transmission, and stops power transmission after the power receiving device 700 passes. Consequently, when the electric vehicle 150 moves to the place where the electric vehicle 150' is illustrated, the resonance frequency of the power transmitting resonance coil included in the power transmitting portion 610_(n−1)(m−1) which is the closest to the power receiving device 700' is set to Resonance frequency D, and thus the power transmitting portion 610_(n−1)(m−1) transmits power to the power receiving device 700' preferentially. In this case, the power transmitting portions adjacent to the power transmitting portion 610_(n−1)(m−1) stop power transmission to the power receiving device 700'.

In this manner, as described in this embodiment, power can be fed (power can be supplied) from the power transmitting device 600 to the power receiving device 700 or the power receiving device 700' with a higher power transmission efficiency (higher power supply efficiency) in consideration of a change over time in the positional relation between the power transmitting device 600 and the power receiving device which moves from the position where the power receiving device 700 is illustrated to the position where the power receiving device 700' is illustrated.

Further, in this embodiment, power supply from the power transmitting portion which does not need to transmit power at this moment can be stopped and power consumption can be reduced by using the power transmitting portion illustrated in FIG. 2C as the power transmitting portion of the power transmitting device.

Note that although FIGS. 6A and 6B illustrates an example in which the power transmitting device 600 is provided on the ground, the power transmitting device 600 may be provided on a side surface (wall) or a top surface (ceiling).

As described above in this embodiment, the use of a power transmitting device including a plurality of power transmitting portions each including a power transmitting resonance coil makes it possible to provide a power feeding system and a power feeding method using a resonance method in which a power transmitting region (a region from which power can be supplied) is increased and power can be supplied with high power transmission efficiency (high power supply efficiency)

.

Further, a power feeding system and a power feeding method in which a power feeding provider (a power transmitting device) can have a high power supply ability to offer power feeding service to more power feeding users (power receiving devices) in a shorter time can be provided.

Further, power feeding users (power receiving devices) can have more usage modes such as power receiving while moving, and a power reception time is shortened, and thus the use efficiency is improved, so that a highly convenient power feeding system and a highly convenient power feeding method can be provided.

Further, a power feeding system and a power feeding method in which a power feeding provider (a power transmitting device) and a power feeding user (a power receiving device) can be specified and managed or can specify and manage each other and which enable a variety of safe power feeding services from the power feeding provider (the power transmitting device) to the power feeding user (the power receiving device) can be provided.

Furthermore, a power feeding system and a power feeding method which can offer a power feeding service which is efficient to both a power feeding user and a power feeding provider can be provided.

This embodiment can be implemented in appropriate combination with any of the structures described in the other embodiment.

This application is based on Japanese Patent Application serial no. 2012-100658 filed with the Japan Patent Office on Apr. 26, 2012, the entire contents of which are hereby incorporated by reference.

What is claimed is:

1. A power feeding system adapted to supply power to a power receiving device comprising:
    a power transmitting device including a power transmitting portion and a power source portion which is electrically connected to the power transmitting portion;
    wherein the power receiving device includes a power receiving portion and a load portion which is electrically connected to the power receiving portion,
    wherein the power transmitting portion which are included in the power transmitting device comprises:
        a power transmitting coil configured to be supplied with power from the power source portion;
        a power transmitting resonance coil which is not in contact with the power transmitting coil and is electromagnetically coupled with the power transmitting coil by electromagnetic induction;
        a directional coupler which inputs reflected power reflected from the power transmitting resonance coil to a detector;
        the detector which determines a value of the reflected power using a reference power value;
        a first switch to which an output from the detector is input; and
        a second switch between the power source portion and the directional coupler, wherein the power receiving portion in the power receiving device comprises:
        a power receiving coil which supplies power to the load portion; and
        a power receiving resonance coil which is not in contact with the power receiving coil and is electromagnetically coupled with the power receiving coil by electromagnetic induction,
    wherein a resonance frequency of the power transmitting resonance coil is set to a first resonance frequency or a second resonance frequency by turning on or off the first switch,
    wherein a resonance frequency of the power receiving resonance coil is either the first resonance frequency or the second resonance frequency,
    wherein the second switch is directly electrically connected to the power source portion and the directional coupler, and
    wherein an output from the detector is input to the second switch.

2. The power feeding system according to claim 1,
wherein the power transmitting portion comprises a capacitor for adjusting the resonance frequency on a power transmitting side which is electrically connected to the power transmitting resonance coil and the first switch; and
wherein the power receiving portion comprises a capacitor for adjusting the resonance frequency on a power receiving side.

3. A power feeding system adapted to supply power to a power receiving device comprising:
a power transmitting device including a plurality of adjacent power transmitting portions and a power source portion which is electrically connected to the plurality of power transmitting portions;
wherein the power receiving device includes a power receiving portion and a load portion which is electrically connected to the power receiving portion,
wherein each of the plurality of adjacent power transmitting portions which are included in the power transmitting device comprises:
a power transmitting coil configured to be supplied with power from the power source portion;
a power transmitting resonance coil which is not in contact with the power transmitting coil and is electromagnetically coupled with the power transmitting coil by electromagnetic induction;
a directional coupler which inputs reflected power reflected from the power transmitting resonance coil to a detector;
the detector which determines a value of the reflected power using a reference power value;
a first switch to which an output from the detector is input; and
a second switch between the power source portion and the directional coupler, wherein the power receiving portion in the power receiving device comprises:
a power receiving coil which supplies power to the load portion; and
a power receiving resonance coil which is not in contact with the power receiving coil and is electromagnetically coupled with the power receiving coil by electromagnetic induction,
wherein a resonance frequency of the power transmitting resonance coil is set to a first resonance frequency or a second resonance frequency by turning on or off the first switch,
wherein a resonance frequency of the power receiving resonance coil is either the first resonance frequency or the second resonance frequency,
wherein the second switch is directly electrically connected to the power source portion and the directional coupler, and
wherein an output from the detector is input to the second switch.

4. The power feeding system according to claim 3,
wherein the power transmitting portion comprises a capacitor for adjusting the resonance frequency on a power transmitting side which is electrically connected to the power transmitting resonance coil and the first switch; an
wherein the power receiving portion comprises a capacitor for adjusting the resonance frequency on a power receiving side.

5. A power feeding method comprising:
a first step of setting resonance frequencies of power transmitting resonance coils in a plurality of power transmitting portions to a first resonance frequency;
a second step of transmitting power which is supplied from power source portions to power transmitting coils to the power transmitting resonance coils;
a third step of transmitting the power from the power transmitting resonance coils to a power receiving device;
a fourth step of inputting reflected power which is reflected by the power transmitting resonance coils in the third step to detectors through directional couplers; and
a fifth step of determining values of the reflected power using a reference power value,
wherein a first power transmitting portion whose reflected power is determined to be smaller than the reference power value in the fifth step continues power transmission to the power receiving device and repeats the third to fifth steps; and
wherein in a second power transmitting portion whose reflected power is determined to be larger than the reference power value in the fifth step, a resonance frequency of the power transmitting resonance coil is set to a second resonance frequency and power transmission to the power receiving device is stopped.

6. The power feeding method according to claim 5, wherein the second power transmitting portion which has stopped power transmission to the power receiving device by setting the resonance frequency of the power transmitting resonance coil to the second resonance frequency repeats the first to fifth steps after a predetermined period of time.

7. The power feeding method according to claim 5, wherein setting the resonance frequency of the power transmitting resonance coil to the first resonance frequency or the second resonance frequency is controlled by the switch which is turned on or off by a signal input from the detector.

8. The power feeding method according to claim 6, wherein setting the resonance frequency of the power transmitting resonance coil to the first resonance frequency or the second resonance frequency is controlled by the switch which is turned on or off by a signal input from the detector.

9. The power feeding system according to claim 1, wherein each of the first switch and the second switch is a transistor comprising an oxide semiconductor.

10. The power feeding system according to claim 3, wherein each of the first switch and the second switch is a transistor comprising an oxide semiconductor.

11. The power feeding method according to claim 5, wherein the switch is a transistor comprising an oxide semiconductor.

* * * * *